(12) United States Patent
Takahashi

(10) Patent No.: US 7,483,222 B2
(45) Date of Patent: Jan. 27, 2009

(54) OBJECTIVE LENS ACTUATOR AND OPTICAL PICKUP DEVICE HAVING THE SAME

(75) Inventor: Kazuhiro Takahashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 17 days.

(21) Appl. No.: 11/882,119

(22) Filed: Jul. 30, 2007

(65) Prior Publication Data

US 2008/0030880 A1 Feb. 7, 2008

(30) Foreign Application Priority Data

Jul. 31, 2006 (JP) .............................. 2006-208012

(51) Int. Cl.
*G02B 7/02* (2006.01)
(52) U.S. Cl. ...................... 359/814; 359/811
(58) Field of Classification Search ................. 359/811, 359/813, 814, 815, 819, 822
See application file for complete search history.

(56) References Cited

U.S. PATENT DOCUMENTS 4,948,230 A * 8/1990 Kasahara et al. ............ 359/823

FOREIGN PATENT DOCUMENTS

| JP | 10-106000 | 4/1998 |
| JP | 11-265516 | 9/1999 |
| JP | 2003-233919 | 8/2003 |
| JP | 2005-116062 | 4/2005 |
| JP | 2005-251295 | 9/2005 |

\* cited by examiner

*Primary Examiner*—Timothy J Thompson
(74) *Attorney, Agent, or Firm*—Morgan Lewis & Bockius LLP

(57) ABSTRACT

An objective lens actuator according to the present invention is provided with a gel holder having a gel holding hole into which suspension wires to hold an objective lens holder are inserted, a gel injection hole connected to the gel holding hole is formed in a round shape on a side surface of the gel holder, an inner diameter of an outer surface side opening of the gel injection hole is made larger than an outer diameter of a needle of a gel dispenser and an inner diameter of an inner surface side opening of the gel injection hole is made smaller than an outer diameter of the needle. By these arrangement the locating of the needle can be performed when the gel material is injected into the gel holding hole by the gel dispenser, it can be prevented that the gel material adheres to around the gel injection hole, and further, it can be prevented that the suspension wires are deformed by an insertion of the needle into the gel holding hole.

7 Claims, 12 Drawing Sheets

US 7,483,222 B2

OBJECTIVE LENS ACTUATOR AND OPTICAL PICKUP DEVICE HAVING THE SAME

This application is based on Japanese Patent Application No. 2006-208012 filed on Jul. 31, 2006, the contents of which are hereby incorporated by reference.

BACKGROUND OF THE INVENTION

1. Field of the Invention

The present invention relates to an objective lens actuator that is provided to an optical pickup device for projecting a light beam to an optical recording medium so that record of information or reading of information can be performed. In particular, the present invention relates to a structure of the objective lens actuator in which an objective lens holder is held by a rod-like elastic member. The present invention relates also to an optical pickup device equipped with the above described objective lens actuator.

2. Description of Related Art

Recently optical recording media including a compact disc (hereinafter referred to as a CD) and a digital versatile disc (hereinafter referred to as a DVD) are widely spread. When information is recorded on or reproduced from such an optical recording medium, an optical pickup device is used, which projects a light beam to the optical recording medium so that information can be recorded or read. In such an optical pickup device, it is required that a light beam emitted from a light source is condensed with high accuracy on a recording surface of the optical recording medium through an objective lens. As a structure to realize the above described requirement, the objective lens actuator becomes indispensable.

As for the objective lens actuator, there is a type of the objective lens actuator which is provided with an objective lens holder holding the objective lens, is held by a plurality of metal wires having elasticity in a shakable manner with respect to a base member. Such an objective lens actuator is provided generally with a focus coil and a tracking coil on the objective lens holder, and with a permanent magnet on the base member. A base plate is stood on the base member and one end of each of the above described metal wires is connected to the base plate, and at the same time, other end of each of the metal wires is connected to the focus coil, the tracking coil and the like. Further, each of the metal wires is adhered to the objective lens holder with an adhesive agent, a solder or the like.

In the objective lens actuator as described above, electric current is supplied to the focus coil, the tracking coil and the like through each of the metal wires. By this arrangement, the objective lens holder is driven in its micro motion by an electromagnetic action with the permanent magnet to perform a focus adjustment, a tracking adjustment and the like for the objective lens. Further, in order to improve driving efficiency for the objective lens holder, some objective lens actuator are provided with a ferromagnetic yoke on the base member to draw effectively magnetic fluxes from the permanent magnets so that high density magnetic fluxes are given to the focus coil, the tracking coil and the tilting coil.

At this point, because vibration will occur in each of the metal wires due to driving of the objective lens holder, various artifices are employed to suppress the vibration. As one artifice, as shown in FIG. 12, a resin molded gel holder 102 having through holes 101 is fixed on the base member (not shown). Six metal wires 100 to hold the objective lens holder in a shakable manner with connection to the focus coil, the tracking coil, the tilting coil and the base plate (all not shown), are inserted through the through hole 101. A gel material containing silicon as a main ingredient, is filled in the through hole 101 in the gel holder 102. At this point, the gel material utilized here is hardened to gel by ultraviolet irradiation for a predetermined duration after the gel material is injected into each of the through holes 101 in the gel holder 102. By this arrangement, the vibration which is generated on each of the metal wires 100 can be attenuated and suppressed by the gel material in each of the through holes 101 in the gel holder 102.

However, as shown in FIG. 12, at the gel holder 102 in the conventional technology, the gel material must be injected from an opening of the through hole 101, in other words, from an insertion direction of the metal wires 100. Because the injection of the gel material is performed near the metal wires 100, a needle 103 of a gel dispenser may contact to the metal wires 100 during the injecting process for the metal wires 100 to be deformed especially when a number of the metal wires 100 inserted to the through hole 101 is large. In such a case, the tilting characteristics of the objective lens actuator becomes worse. Further, when viscosity of the gel material which is injected is high and speed of injecting is high, the gel material overflows from the opening of the through hole 101 before the gel material arrives at bottom of the through hole 101 because of the surface tension.

By this reason various technology is proposed to prevent problems which occur during the above described gel material injecting process. For example, JP-A-H11-265516 and JP-A-2005-116062 disclose the optical pickup device in that the through hole made in the gel holder into which the metal wires are inserted, has opening made in a side surface of the gel holder. By this arrangement, because the injecting process of the gel material is performed from the side surface of the gel holder, and contact of the needle of the gel dispenser to the metal wires are made less, efficiency of the gel material injecting process can be improved.

The optical pickup devices disclosed in JP-A-H11-265516 and JP-A-2005-116062, has merit that the gel material is easily filled because the through hole has the opening in the side surface through which the gel material is injected, however, on the other hand, the filled gel material tends to be formed in concave or convex shape at its surface of the opening in the vertical direction, and it is difficult to fill a given amount of the gel material into each of the through holes because the through hole is wide opened in the side surface. When the amount of the filled gel material at each through holes becomes different, control action against vibration for each of the metal wires which is inserted into each of the through holes is not performed evenly. This results in problems of deterioration of moving characteristics of the object lens and read and write characteristics of the optical pickup device.

For this problem, in JP-A-H10-106000, JP-A-2003-233919 and JP-A-2005-251295, an optical pickup device is disclosed in which an injection hole to fill the gel material is arranged on a side surface of the through hole formed in the gel holder. By this arrangement, when the gel material is filled from the injection hole, the gel material is not formed in concave or convex shape at its surface in the vertical direction, and the gel material can be filled equally in amount for each of the through holes.

In the structure of the optical pickup devices disclosed in JP-A-H10-106000, JP-A-2003-233919 and JP-A-2005-251295, the amount of the gel material filled in each of the through holes can become equal by the injection of the gel material through the injection hole arranged in the gel holder, however, it causes a problem that a tip portion of the needle tends to be inserted from the injection hole into inside of the through hole, and the needle may contact to the metal wires which are inserted into the through hole and then, may make the metal wires deformed if inner diameter of the injection hole is made larger than outer diameter of the needle. On the other hand, if the inner diameter of the injection hole is made smaller than the outer diameter of the needle, the tip portion of the needle tends to detach from the injection hole during the gel material injecting process because the tip portion of the needle is not located to fix to the injection hole, it causes a problem that the gel material adheres to surroundings of the gel injection hole. Further, if a shape of cross section of the tip portion of the needle and that of the injection hole are different, a space is formed between the needle and the injection hole when the tip portion of the needle is located at the injection hole, it causes a problem that the gel material spills out from the space during the gel injecting process.

SUMMARY OF THE INVENTION

In view of the above described problems it is an object of the present invention to provide the objective lens actuator that can attain locating of the needle of an injector, can prevent the gel material from adhering to around the gel injection hole, and further, can surely prevent deformation of the rod-like elastic members which are inserted into the gel holding hole by the needle when the gel material is injected into the gel holder, and to provide the optical pickup device having the same.

To attain the above described object an objective lens actuator in accordance with a first aspect of the present invention has a structure that includes: a base member having a yoke; an objective lens holder to which a plurality of coils are fixed for holding an objective lens; a plurality of rod-like elastic members to hold the objective lens holder in a movable manner; a permanent magnet to compose a magnetic circuit along with the yoke; and a gel holder having a plurality of gel holding holes inside of which a gel material is filled, and enabling vibration of the rod-like elastic members to be attenuated by inserting the rod-like elastic members into the gel holding hole, in that the objective lens holder is moved by an electromagnetic action between the permanent magnet and the coils to move the objective lens, a gel injection hole connected to the gel holding hole is made by boring in a round shape on a side surface or an upper surface of the gel holder, an inner diameter of an outer surface side opening of the gel injection hole is made larger than an outer diameter of a needle of an injector which is utilized for injection of the gel material, and an inner diameter of an inner surface side opening of the gel injection hole is made smaller than an outer diameter of the needle.

By these structure, the locating of needle can be performed when the gel material is injected into the gel holding hole provided on the gel holder, by means that the tip portion of the needle of the gel dispenser is inserted from the outer surface side opening. As a result it can be prevented that the tip portion of the needle is detached from the gel injection hole when the gel material is injected, and that the gel material adheres to around the gel injection hole. Further, because the inner diameter of the inner side of the gel injection hole is made smaller than the outer diameter of the needle, it would not happen that the tip portion of the needle is inserted into the gel holding hole through the injection hole, and as a result, it can be surely prevented that the rod-like elastic members inserted into the gel holding hole are deformed by the needle.

The objective lens actuator according to a second aspect of the present invention has a structure in the above described aspect, in that the inner diameter of the inner surface side opening of the gel injection hole is substantially made equal to or larger than an inner diameter of the needle.

By this structure, because the injection of the gel material from the needle is not disturbed by the inner surface of the gel injection hole, the working efficiency of the gel injecting process does not become worse. Further, it can be prevented that the tip portion of the needle is detached from the gel injection hole by pressure of the gel which is injected.

The objective lens actuator according to a third aspect of the present invention has a structure in the above described aspect, in that an inner surface of the gel injection hole is formed in a tapered shape whose inner diameter becomes smaller as it goes to inner surface side.

By this structure because the needle can be inserted along the inner surface made in the tapered shape, the locating of needle can be easily attained when the tip portion of the needle of the gel dispenser is inserted into the gel injection hole.

The objective lens actuator according to a fourth aspect of the present invention has a structure in the above described aspect, in that a contacting edge which protrudes to internal side of the radial direction of the gel injection hole is formed at the inner surface side opening of the gel injection hole to contact with abutment to the needle, the inner diameter of the gel injection hole at a position where the contacting edge and the needle contact with abutment, is made substantially equal to the outer diameter of the needle, and an amount of the protrusion of the contacting edge is substantially made equal to or smaller than a thickness of the needle.

By this structure, the locating of needle can be more precisely attained when the gel material is injected into the gel holding hole provided on the gel holder, by means that the tip portion of the needle of the gel dispenser is inserted to the gel injection hole and the tip portion of the needle is contacted with abutment to the contacting edge. As a result it can be surely prevented that the gel material adheres to around the gel injection hole. Further, because the amount of the protrusion of the contacting edge is substantially made equal to or smaller than a thickness of the needle, the injection of the gel material from the needle is not disturbed by the contacting edge, and it is prevented that the tip portion of the needle is detached from the gel injection hole by pressure of the gel material which is injected.

The objective lens actuator according to a fifth aspect of the present invention has a structure in the above described aspect, in that the gel injection hole is made by boring in a position corresponding to the center portion between a couple of the opening surfaces of the gel holding hole which are arranged opposing to an inserting direction of the rod-like elastic members.

By this structure because a distance from the inner surface side opening of the gel injection hole to one of the opening of the gel holding hole and a distance from the inner surface side opening of the gel injection hole to another one of the opening become the same, when the gel material is injected from one of the opening of the gel holding hole to other opening of the gel holding hole, the gel material can be filled evenly in a direction parallel to the rod-like elastic members without spilling out from any one of the opening.

The objective lens actuator according to a sixth aspect of the present invention has a structure in the above described aspect, in that an inner surface side opening of the gel injection hole is arranged at a portion which does not oppose to the rod-like elastic members that are inserted in the gel holding hole.

By this structure it can be prevented that the rod-like elastic members inserted into the gel holding hole, are deformed by pressure of the gel material which is injected from the gel injection hole when the gel material is injected.

Further, to attain the above described object, an optical pickup device in accordance with a seventh aspect of the present invention has a structure that includes: a light source; an objective lens for condensing a light beam emitted from the light source on a recording surface of an optical recording medium; and an objective lens actuator including a base member having a yoke; an objective lens holder to which a plurality of coils are fixed for holding the objective lens; a plurality of suspension wires to hold the objective lens holder in a movable manner; a permanent magnet to compose a magnetic circuit along with the yoke; and a gel holder having a plurality of gel holding holes inside of which a gel material is filled, and enabling vibration of the suspension wires to be attenuated by inserting the suspension wires into the gel holding hole, in that the objective lens holder is moved by an electromagnetic action between the permanent magnet and the coils to move the objective lens, a gel injection hole connected to the gel holding hole is made by boring in a round shape on a side surface of the gel holder, the gel injection hole is made by boring in a position corresponding to the center portion between a couple of the opening surfaces of the gel holding hole which are arranged opposing to an inserting direction of the suspension wires, an inner surface side opening of the gel injection hole is arranged at a portion which does not oppose to the suspension wires that are inserted in the gel holding hole, an inner diameter of the outer surface side opening of the gel injection hole is made larger than an outer diameter of a needle of an injector which is utilized for injection of the gel material, an inner diameter of the inner surface side opening of the gel injection hole is made smaller than an outer diameter of the needle, the inner diameter of the inner surface side opening of the gel injection hole is substantially made equal to or larger than an inner diameter of the needle, and an inner surface of the gel injection hole is formed in a tapered shape whose inner diameter becomes smaller as it goes to inner surface side.

By this structure, locating of the needle can be performed when the gel material is injected by means that the needle of an injector is inserted from the outer surface side opening. As a result it can be prevented that the tip portion of the needle is detached from the gel injection hole, and that the gel material adheres to around the gel injection hole. Further, because the tip portion of the needle can not be inserted into the gel holding hole from the gel injection hole, it can be surely prevented that the suspension wires are deformed by the needle. In addition, because the injection of the gel material from the needle is not disturbed by the inner surface of the gel injection hole, the working efficiency of the gel injecting process does not become worse. Further, it can be prevented that the tip portion of the needle is detached from the gel injection hole by pressure of the gel which is injected. In addition, the gel material can be injected evenly in a direction parallel to the suspension wires. Further, it can be prevented that the suspension wires which are inserted into the gel holding hole is deformed by the pressure of the gel material that is injected from the gel injecting hole when the gel material is injected.

DETAILED DESCRIPTION OF THE PREFERRED EMBODIMENTS

Hereinafter, the embodiments of the present invention will be described with reference to the attached drawings. At this point, it should be understood that the embodiments described below are merely examples, and the present invention is not limited to these embodiments described below.

Figure 1:
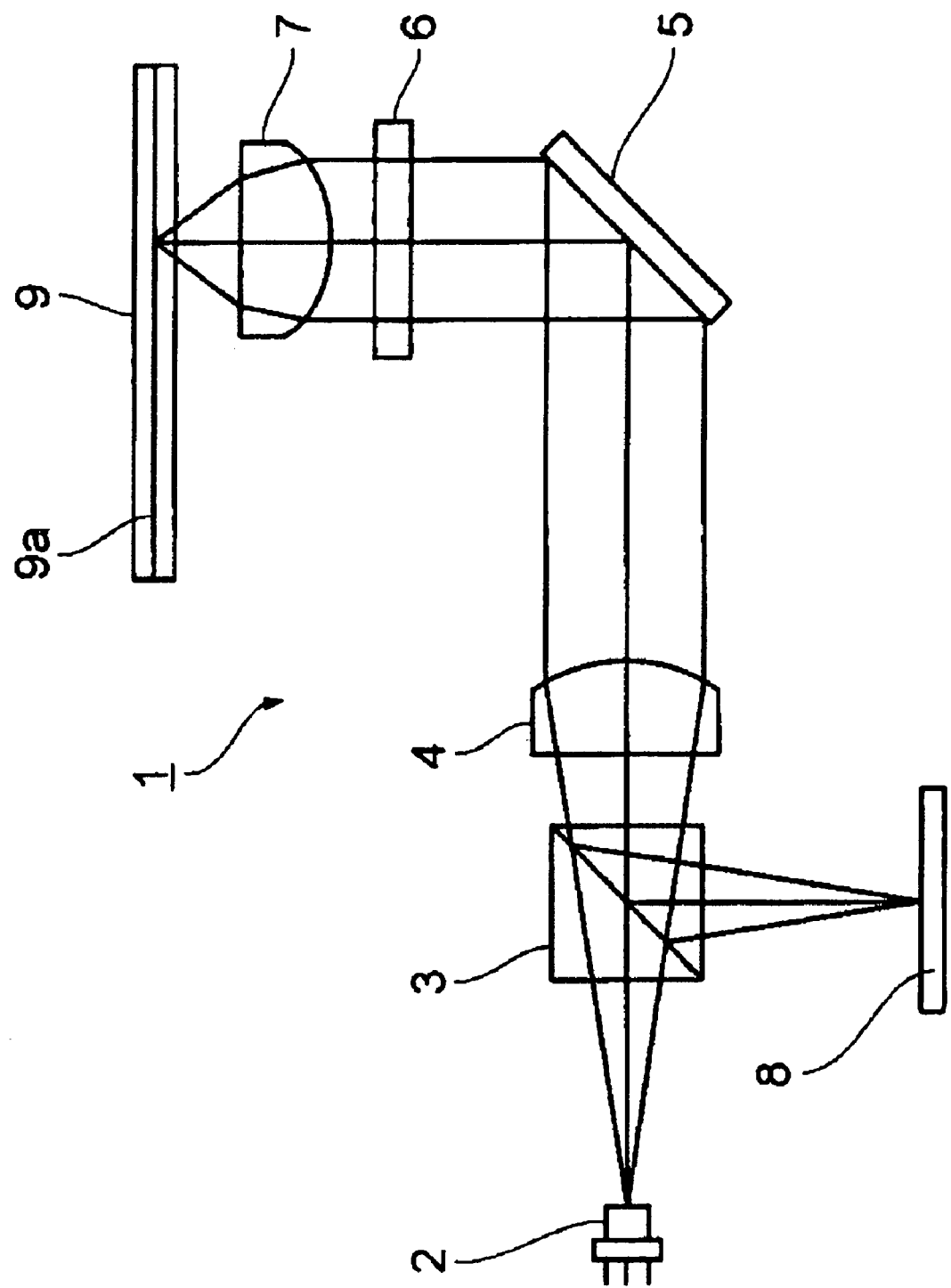
FIG. 1 is a schematic diagram to show a structure of an optical system of an optical pickup device according to the present invention.

FIG. 1 is a schematic diagram to show a structure of an optical system of an optical pickup device having an objective lens actuator according to the present invention. In FIG. 1, numeral 1 denotes an optical pickup device, which enables to project a light beam to an optical recording medium 9, for example, such as a CD, a DVD, and the like and to receive a reflection light from the optical recording medium 9 for reading information recorded on a recording surface 9*a* of the optical recording medium 9, and also to project a light beam to the optical recording medium 9 for writing information on the recording surface 9*a*. The optical system of this optical pickup device 1 is made up of a light source 2, a beam splitter 3, a collimator lens 4, an upstand mirror 5, a quarter wavelength plate 6, an objective lens 7, and a photo detector 8, for example. Hereinafter, detail of each optical element will be described.

The light source 2 is composed of a semiconductor laser, and the light source 2 emits a light beam whose wavelength is 780 nm or 650 nm respectively when the optical pickup device 1 is for a CD or a DVD, for example. At this point, in this embodiment though a structure which includes only one light source emitting a light beam with only one wavelength is utilized, the present invention is not limited to this structure. For example, a structure which includes a plurality of light sources each emitting a light beam with one wavelength, may be utilized for the present invention. Alternatively, a two-wavelength combination light source housed in a single package may be used for the light source, for example.

The beam splitter 3 works as a separation element for separating the light beam, and permits the light beam emitted from the light source 2 to pass through and leads the light beam to the optical recording medium 9, while it reflects the light beam that was reflected by the optical recording medium 9 and leads the light beam to the photo detector 8. The light beam that passed through the beam splitter 3 is sent to the collimator lens 4.

The collimator lens 4 is a lens for converting the light beam that passed through the beam splitter 3 into parallel light. The term "parallel light" means light in which all optical paths of the light beam emitted from the light source 2 are substantially parallel with the optical axis. The parallel light that passed through the collimator lens 4 is sent to the upstand mirror 5.

The upstand mirror 5 reflects the light beam that passed through the collimator lens 4 and leads the light beam to the optical recording medium 9. The upstand mirror 5 is tilted from the optical axis of the light beam from the collimator lens 4 by 45 degrees. The optical axis of the light beam reflected by the upstand mirror 5 is substantially perpendicular to the recording surface 9a of the optical recording medium 9. The light beam reflected by the upstand mirror 5 is sent to the quarter wavelength plate 6.

The quarter wavelength plate 6 converts the light beam with linear polarization emitted from the light source 2 and reflected by the upstand mirror 5 into a light beam with circular polarization. The light beam that passed through the quarter wavelength plate 6 is sent to the objective lens 7.

The objective lens 7 condenses the light beam that passed through the quarter wavelength plate 6 on the recording surface 9a of the optical recording medium 9. The numerical aperture (NA) of the objective lens 7 is set to NA=0.5 or NA=0.65 respectively, if the optical pickup device 1 is for a CD or a DVD, for example. This objective lens 7 is mounted on the objective lens actuator that will be described later and is structured to be capable of moving in a predetermined direction.

The reflection light reflected by the optical recording medium 9 passes through the objective lens 7 and the quarter wavelength plate 6. The reflection light that passed through the quarter wavelength plate 6 is converted into the light with the linear polarization. In this case, a polarization angle of the linear polarization and the polarization angle of the light beam emitted from the light source 2 are polarized by 90 degrees. The reflection light that passed through the quarter wavelength plate 6 is reflected by the upstand mirror 5 and is reflected by the beam splitter 3 after passing through the collimator lens 4, then, it reaches a light receiving portion (not shown) of the photo detector 8.

The photo detector 8 converts the received light information into an electric signal, which is output to an RF amplifier (not shown) or the like, for example. Then, this electric signal is used as a reproduction signal of data recorded on the recording surface 9a and further as a servo control signal for performing the focus control or the tracking control.

Figure 2:
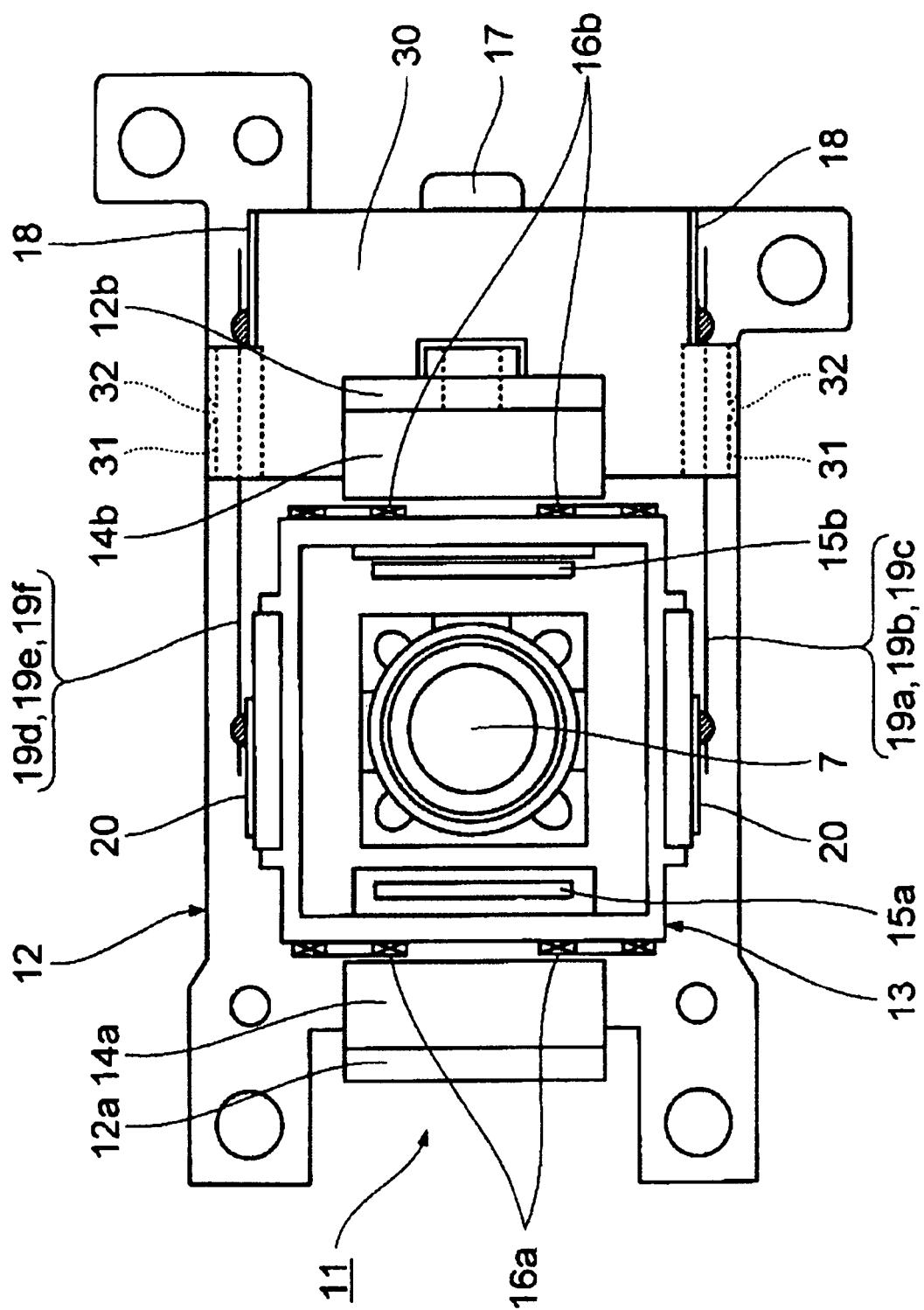
FIG. 2 is a schematic top view to show a structure of an objective lens actuator according to the present invention.
Figure 3:
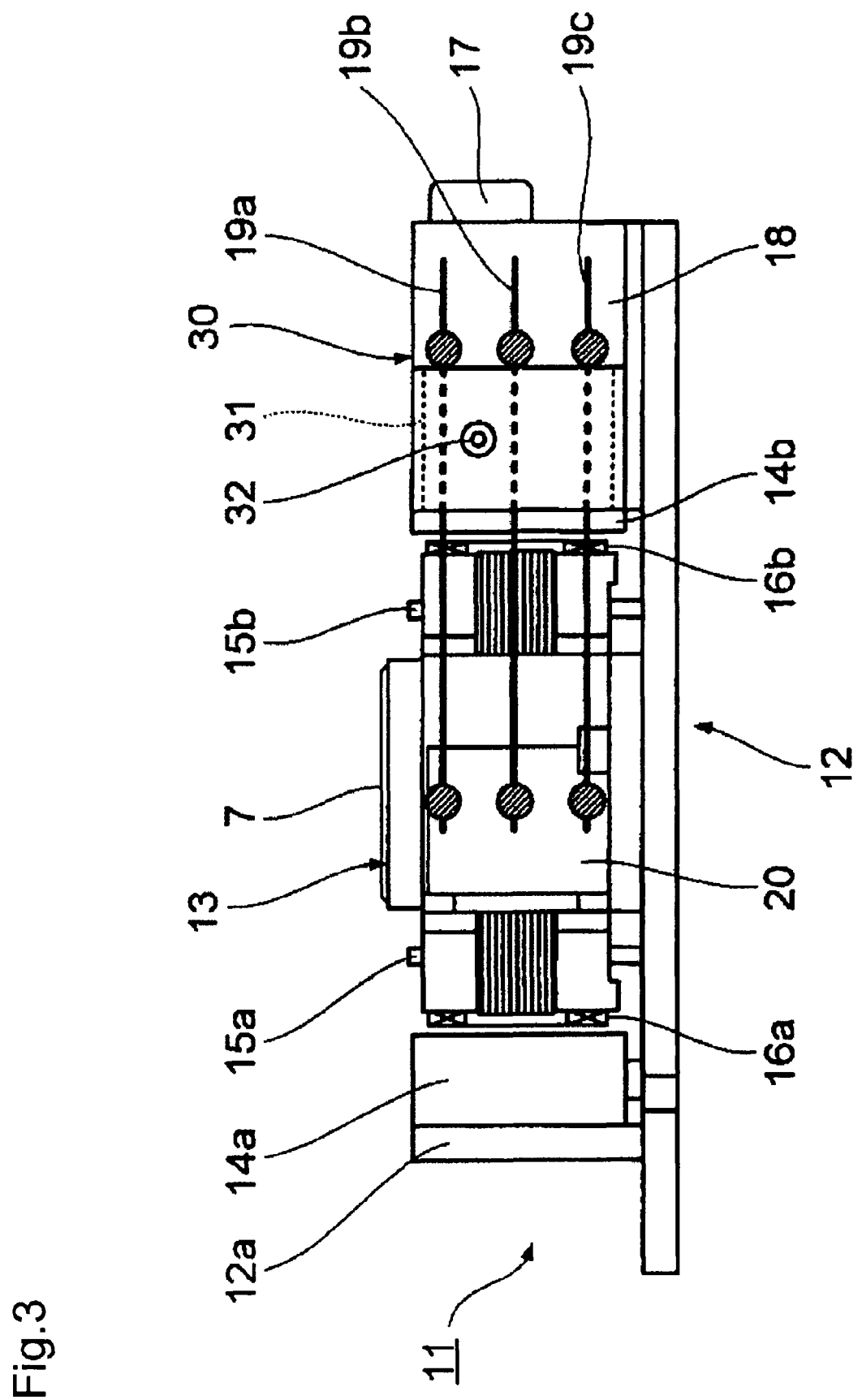
FIG. 3 is a schematic side view to show a structure of the objective lens actuator according to the present invention.
Figure 4:
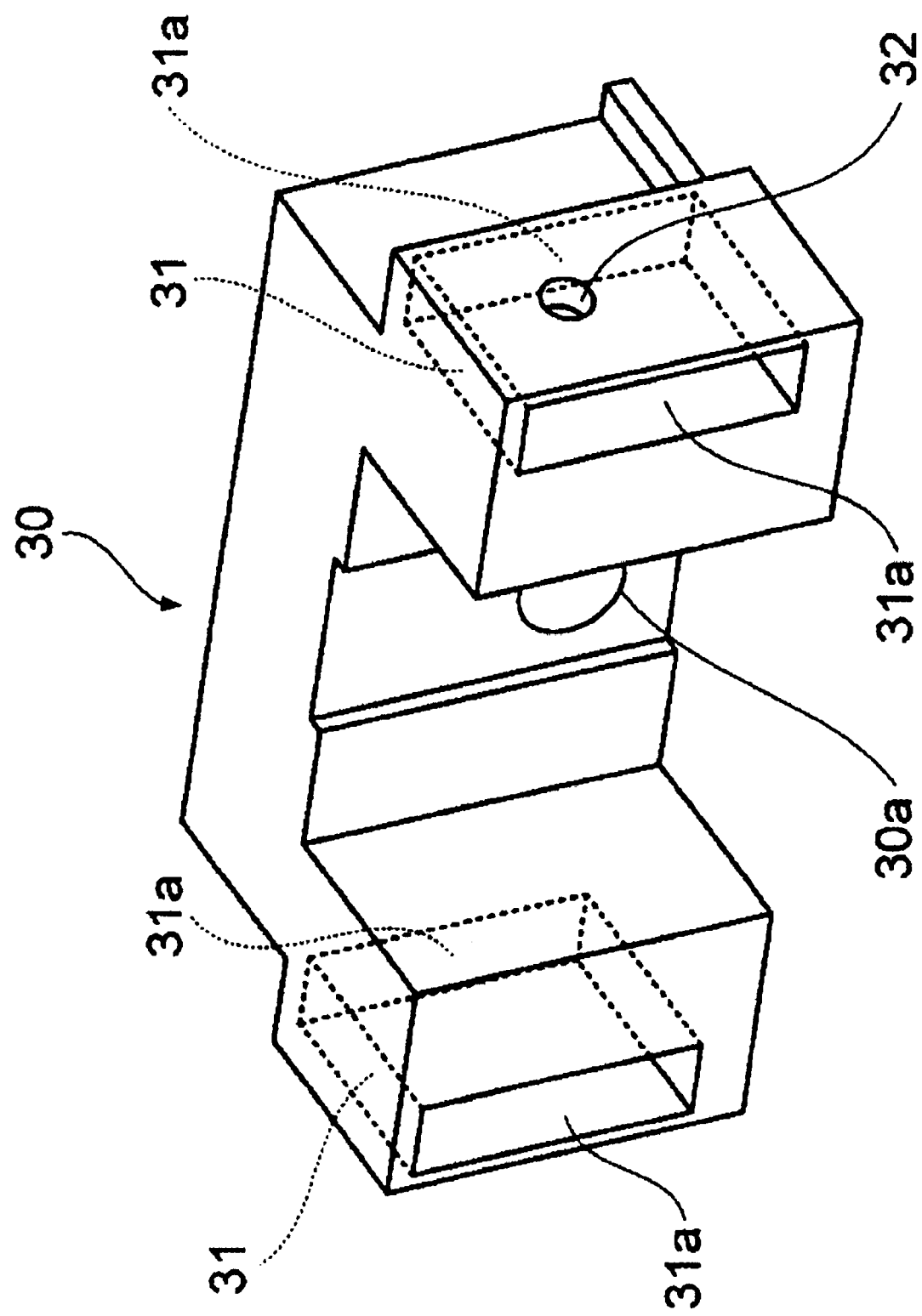
FIG. 4 is a perspective view to show a gel holder that are provided to the objective lens actuator according to a first embodiment.

Next, details of the objective lens actuator 11 of this first embodiment that is provided to the optical pickup device 1 will be described with reference to FIG. 2 and FIG. 3. FIG. 2 is a schematic top view to show a structure of the objective lens actuator 11 according to the first embodiment, and FIG. 3 is a schematic side view to show a structure of the objective lens actuator 11 shown in FIG. 2. FIG. 4 is a perspective view to show a gel holder 30 that are provided to the objective lens actuator 11 according to the first embodiment.

The objective lens actuator 11 in this embodiment, is basically made up of a base member 12 having ferromagnetism and an objective lens holder 13 that is molded from a resin and the like. A through hole (not shown) is formed substantially at the center of the base member 12 so as to permit the light beam from the light source 2 (see FIG. 1) to pass through, and the objective lens holder 13 is arranged there, which will be described later in detail. In addition, a pair of permanent magnets 14a and 14b are arranged to stand on the base member 12, and they face each other so as to sandwich the objective lens holder 13 with a predetermined gaps. The outer surfaces of these permanent magnets 14a and 14b are respectively attracted magnetically and fixed to the protrusions 12a and 12b that are shaped to bend from a foundation of the base member 12. Thus, the permanent magnets 14a and 14b are fixed to the base member 12 in a magnetically integrated state.

In addition, a pair of yokes 15a and 15b are arranged to stand on the base member 12 between the permanent magnets 14a and 14b so that they face each other in the direction parallel to the facing direction of these permanent magnets 14a and 14b. At this point, these yokes 15a and 15b are shaped to bend from the foundation of the base member 12, and have a role of effectively drawing magnetic fluxes from each of the permanent magnets 14a and 14b so that high density magnetic fluxes are given mainly to a focus coil and tracking coils 16a and 16b disposed between them, which will be described later. Thus, drive efficiency of the objective lens holder 13 can be enhanced.

The objective lens holder 13 holds the objective lens 7 at the center portion of the upper surface thereof. On the objective lens holder 13, the focus coil (not shown) is arranged so as to surround the optical axis of the objective lens 7, and the focus coil is fixed on the objective lens holder 13 by adhesive agent or the like. In addition, the tracking coils 16a and 16b are fixed by adhesive agents or the like to the both outer surface of the side wall of the objective lens holder 13 at the opposed sides facing to the respective permanent magnets 14a and 14b.

These tracking coils 16a and 16b are formed as two pairs in right and left respectively, and they are connected by one line in series as a whole. Further, on the objective lens holder 13, the tilting coils (not shown) are arranged so as to surround the respective yokes 15a and 15b, and the tilting coils are fixed on the objective lens holder 13 by adhesive agent or the like. In addition, these tilting coils are also connected by one line in series as a whole.

In addition, a gel holder 30 that is molded of resin such as polycarbonate or the like is arranged on the outer surface of the protrusion 12b to which one of the permanent magnet 14b is fixed magnetically on the base member 12. On this gel holder 30 a round hole 30a is made by boring at the center portion of the width direction. The gel holder 30 is fastened on the base member 12 by connecting a fixing screw 17 to the protrusion 12b through this round hole 30a. Further, adjoining to both side surface of the gel holder 30, circuit boards 18 are arranged to stand.

To this circuit boards 18, each one end of the suspension wire 19a, 19b, 19c, 19d, 19e and 19f having conducting properties is connected by soldering at three positions in the vertical direction respectively. In addition, as shown in FIG. 4, gel holding holes 31 where gel material described below is filled, are made in both left and right side of the gel holder 30. Each of this gel holding hole 31 is arranged to have a pair of opening surfaces 31a which opposes to each other in horizontal direction in order for the suspension wires 19a-19f to penetrate through the gel holding hole 31, and six of each suspension wires 19a-19f are inserted to the gel holding hole 31 through the opening surface 31a.

In addition, each another end of the suspension wires 19a-19f is connected by soldering to the circuit boards 20 which are arranged to stand adjoining to both right and left sides of the objective lens holder 13. By this arrangement, the objective lens holder 13 is supported by each of the suspension wires 19a-19f in a shakable manner with respect to the base member 12. Then, the other ends of each of the suspension wires 19a and 19d in the upper level are connected to the focus coil, while the other ends of each of the suspension wires 19b and 19e in the middle level are connected to the tracking coils, and the other ends of each of the suspension wires 19c and 19f in the lower level are connected to the tilting coils, respectively.

Further, each of the gel holding holes 31 in the gel holder 30 into which each of the suspension wires 19a-19f is inserted, is filled with gel material whose main ingredient is silicone. At this point, the gel material is formed by low viscosity gel material (sol) injected into each of the gel holding holes 31 in the gel holder 30 and irradiated by ultraviolet rays for predetermined time to become a gel state. This gel holder 30 plays a role by the gel material of reducing and controlling vibration generated in each of the suspension wires 19a-19f caused by driving of the objective lens holder 13.

At this point, as shown in FIG. 2 to FIG. 4, a gel injection hole 32 for the injection of the gel material is made by boring in the side surface of the gel holder 30. The gel injection hole 32 is made in a round shape for connecting to each of the gel holding hole 31 to which each of the suspension wires 19a-19f are inserted in the gel holder 30. At this point, the gel injection hole 32 is arranged in a position corresponding to the center portion between the couple of the opening surfaces 31a of the gel holding hole 31 such that the gel material can be injected uniformly in a parallel direction with the suspension wires 19a-19f when the gel material is injected. In addition, the gel injection hole 32 is arranged in a position that height of the inner side opening of the gel injection hole 32 (an opening portion of the gel injection hole 32 in a side of the gel holding hole 31) does not oppose to any of the suspension wires 19a-19f inserted in the gel holding hole 31 in order not for the suspension wires 19a-19f to be deformed by pressure of the gel material which is injected from the gel injection hole 32 when the gel material is injected.

Figure 5:
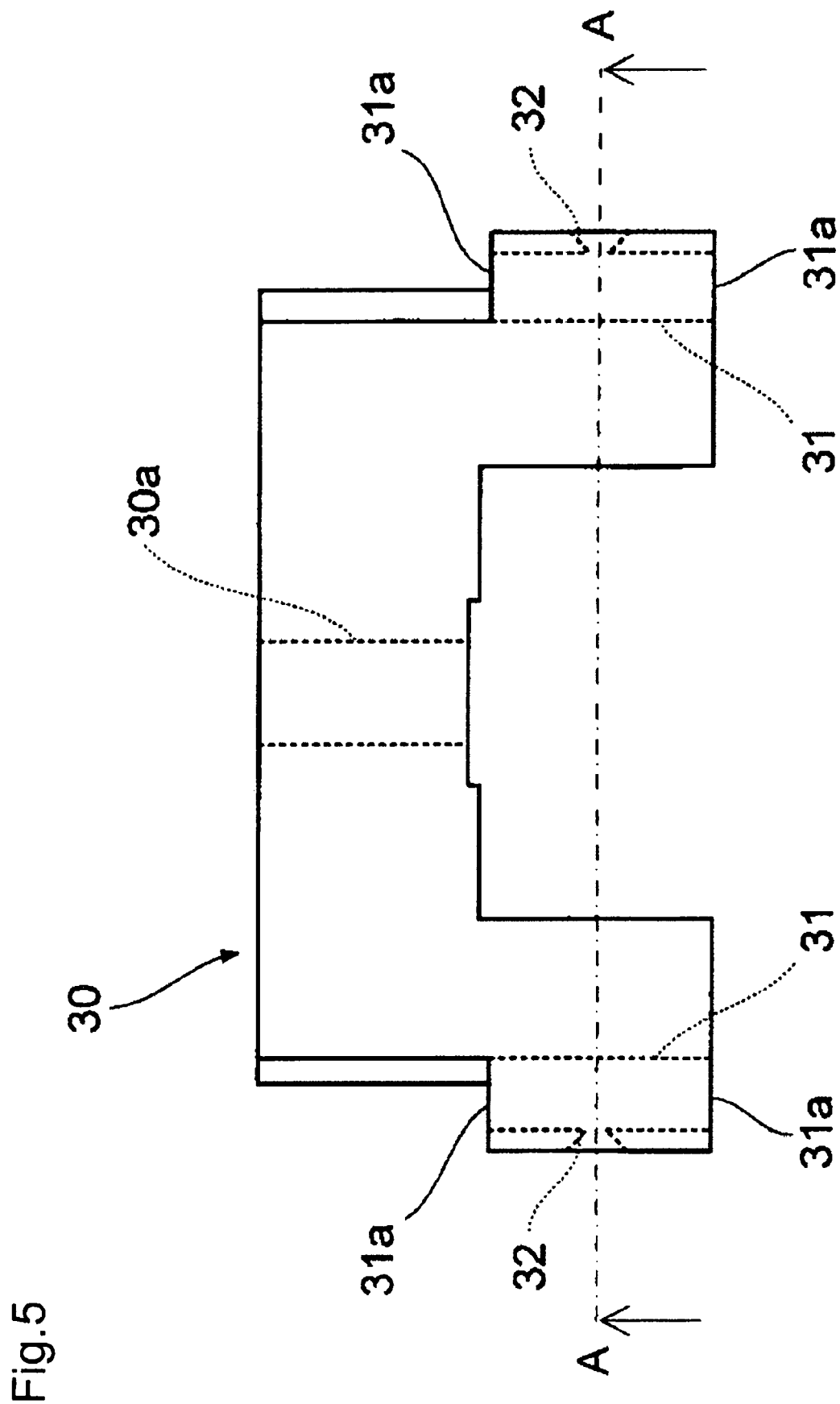
FIG. 5 is a schematic top view to show a structure of a gel holder according to the first embodiment.
Figure 6:
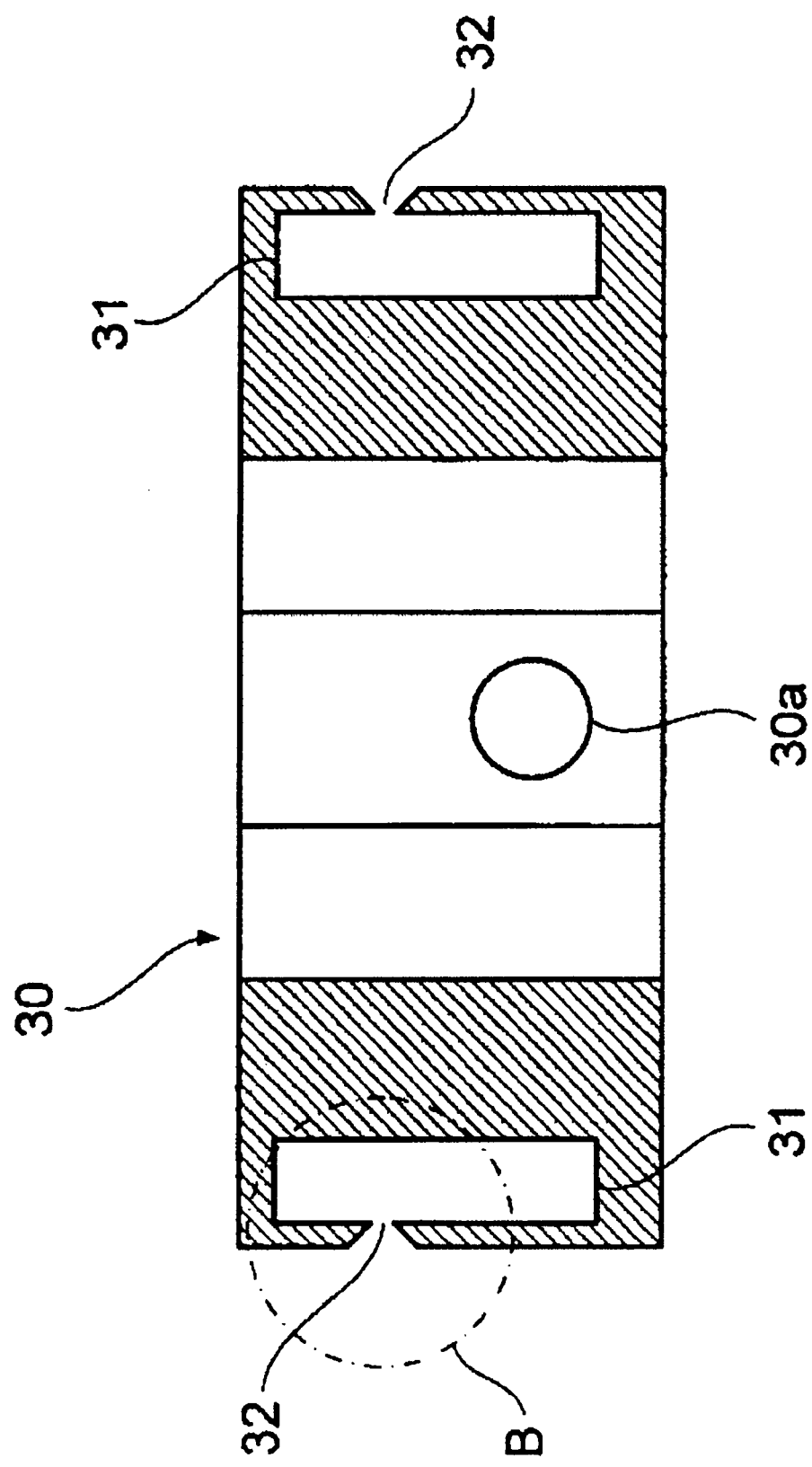
FIG. 6 is a cross sectional view when cut along the dot and dash line A-A in FIG. 5 (A-A line cross sectional view shown by arrows A, A).
Figure 7:
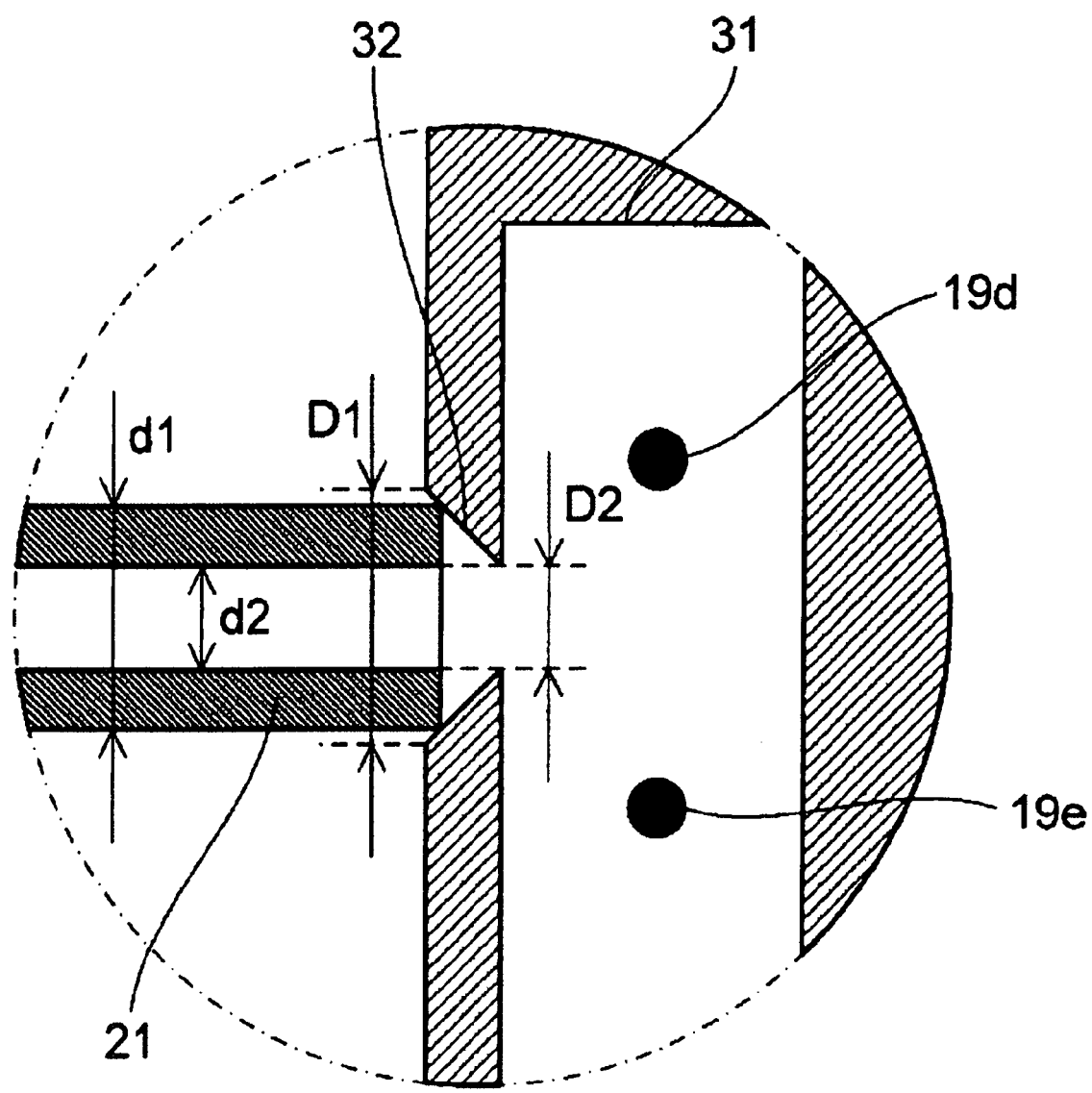
FIG. 7 is a partial enlarged view around a gel injection hole which is provided to the gel holder according to the first embodiment.

Hereinafter, these gel injection holes 32 will be described in detail with reference to FIG. 5 to FIG. 7. FIG. 5 is a schematic top view to show a structure of the gel holder 30 utilized in the object lens actuator 11 according to the first embodiment, FIG. 6 is a cross sectional view when cut along the dot and dash line A-A in FIG. 5 (A-A line cross sectional view shown by arrows A, A), and FIGS. 7 is a partial enlarged view around the gel injection hole 32 (inside the circle B shown in FIG. 6). For the sake of convenience in the explanation, the suspension wires 19d and 19e, and the needle 21 of the gel dispenser are also shown in the figure.

In the gel holder 30 utilized in the objective lens actuator 11 according to the first embodiment, as shown in FIG. 5 to FIG. 7, the inner surface of the gel injection hole 32 is formed in a tapered shape in which the inner diameter of the gel injection hole 32 becomes smaller as it goes to the inner surface side such that the inner diameter D1 of the outer side opening (opening in a side surface of the gel holder 30) is larger than the inner diameter D2 of the inner side opening (D1>D2). In addition, these inner diameters, D1 at the outer surface side and D2 at the inner surface side are arranged such that the inner diameter D1 of the outer surface side is larger than an outer diameter d1 of the needle 21 (D1>d1) and that the inner diameter D2 of the inner surface side is smaller than the outer diameter d1 of the needle 21 (D2<d1) with respect to the outer diameter d1 of the needle 21 of the gel dispenser which is used for the injection of the gel material.

In other words, if the outer diameter d1 of the needle 21 of the gel dispenser is 0.9 mm, for example, the inner diameter D1 of the outer surface side of the gel injection hole 32 is made 1.0 mm such that it is larger than the 0.9 mm, and the inner diameter D2 of the inner surface side of the gel injection hole 32 is made 0.4 mm such that it is smaller than the 0.9 mm.

By these arrangement, the locating of needle 21 can be performed when the gel material is injected into the gel holding hole 31 provided in the gel holder 30, by means that the tip portion of the needle 21 of the gel dispenser is made contacted with abutment to the inner surface of the gel injection hole 32 made in tapered shape. As a result it can be prevented that the tip portion of the needle 21 is detached from the gel injection hole 32 when the gel material is injected, and that the gel material adheres to around the gel injection hole 32. Further, because the inner diameter D2 of the inner surface side of the gel injection hole 32 is made smaller than the outer diameter d1 of the needle 21, it would not happen that the tip portion of the needle 21 is inserted into the gel holding hole 31 through the gel injection hole 32, and as a result, it can be surely prevented that the suspension wires 19a-19f inserted into the gel holding hole 31 are deformed by the needle 21.

At this point, it is preferable that the inner diameter D2 of the inner surface side of the gel injection hole 32 is made equal to or larger than the inner diameter d2 of the needle 21 (D2≧d2). In other words, for example, if the inner diameter d2 of the needle 21 is 0.4 mm, it is preferable that the inner diameter D2 of the inner surface side of gel injection hole 32 is made 0.4 mm or more. This is because there may be problems that not only the injection of the gel material from the needle 21 is disturbed by the inner surface of the gel injection hole 32, and the working efficiency of the gel material injecting process become worse, but also the tip portion of the needle 21 is detached from the gel injection hole 32 by pressure of the gel material which is injected if the inner diameter D2 of the inner surface side is smaller than the inner diameter d2 of the needle 21.

Further, as for angle of the taper of the inner surface of the gel injection hole 32 which is formed in tapered shape, it is preferable that the angle of the taper is formed substantially 45 degrees because too small tapered angle may make the tip portion of the needle 21 impossible to be located. When an edge of the tip portion of the needle 21 is made in tapered shape, by making the angle of taper of the inner surface of the gel injection hole 32 match with the taper angle of the edge of the tip portion of the needle 21, there are not only effect of the locating of the needle 21, but also it is possible to control a shaking of the needle 21. Further, no space is made between the edge of the tip portion of the needle 21 and the inner surface of the gel injection hole 32, when the gel material is injected, spilling out of the gel material from the gel injection hole 32 can be prevented.

Figure 8:
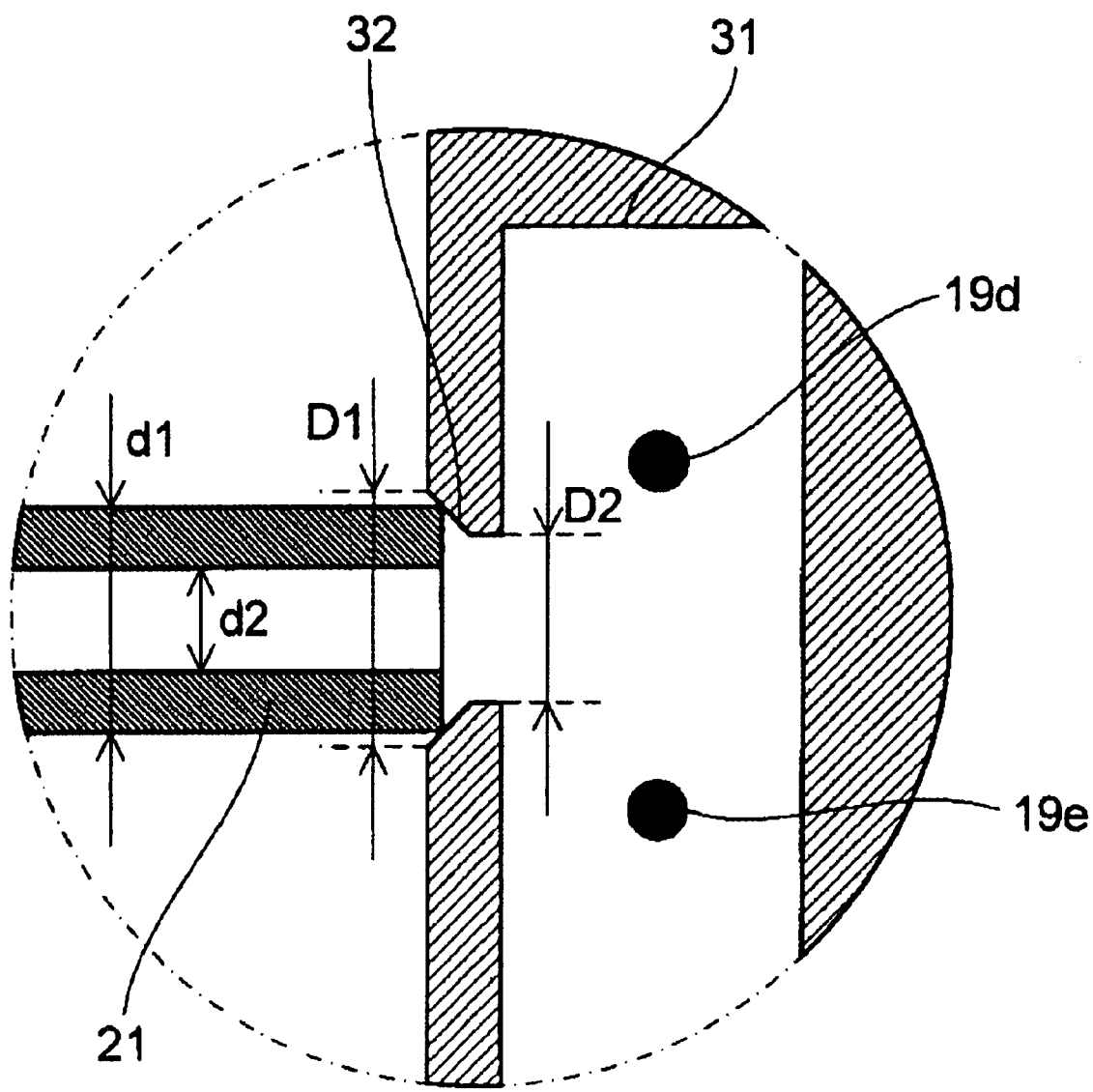
FIG. 8 is a partial enlarged view around a gel injection hole to show another structure of the gel holder according to the first embodiment.

As for another structure of the first embodiment, instead of making the inner surface of the gel injection hole 32 in the tapered shape from the outer surface side of the opening of the gel injection hole 32 to the inner surface side of the opening as a whole as shown in FIG. 7, it may be applicable that a structure in which an edge of the inner surface side of the opening is cut out as shown in FIG. 8. Even in this case also, the needle 21 can be located and it can be prevented that the tip portion of the needle 21 is inserted into the gel holding hole 31 through the gel injection hole 32. In addition in this case, because the edge of the inner surface side opening of the gel injection hole 32 can have enough thickness, strength of the edge can be improved.

Next, a second embodiment of the object lens actuator 11 of the present invention will be described. The gel holder 30 which is utilized in the objective lens actuator 11 in the second embodiment is quite the same as that in the first embodiment except a structure of the gel injection hole 32. In the following, the structure of the gel injection hole 32 which is different from that in the first embodiment will be only described. At this point, the same members which are utilized in the first embodiment will be given the same reference numerals.

Figure 9:
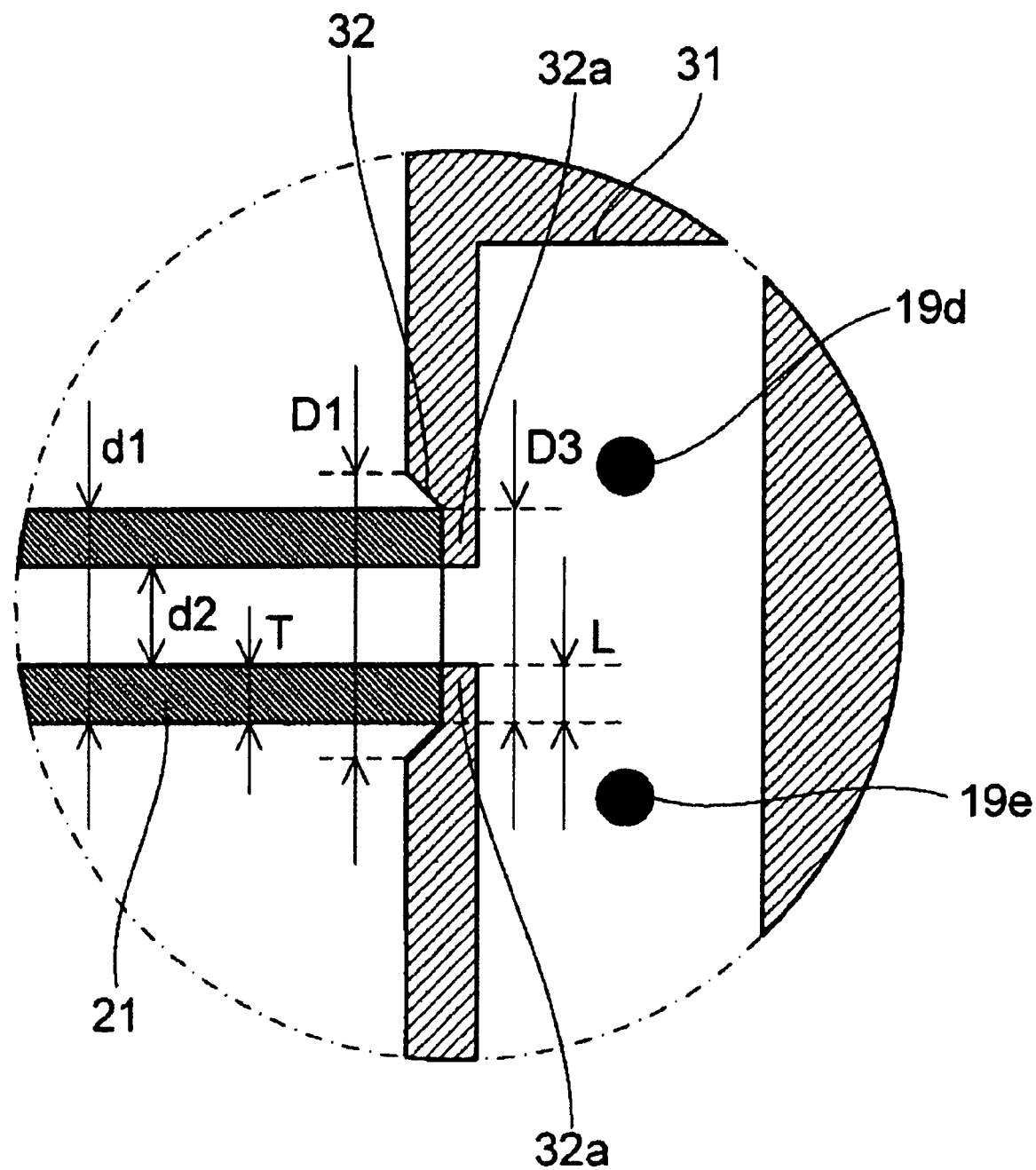
FIG. 9 is a partial enlarged view around a gel injection hole which is provided to a gel holder according to a second embodiment.

FIG. 9 is a partial enlarged view around the gel injection hole 32 of the gel holder 30 according to the second embodiment. For the sake of convenience in the explanation, the suspension wires 19d and 19e, and the needle 21 of the gel dispenser are also shown in the drawing.

As shown in FIG. 9, in this embodiment, a contacting edge 32a which protrudes to internal side of the radial direction of the gel injection hole 32 is formed at the edge of the inner surface of the inner surface side opening of the gel injection hole 32 formed in the gel holder 30, and the contacting edge 32a contacts with abutment to the needle 21. The inner diameter D3 of the gel injection hole 32 at the portion where this contacting edge 32a and the needle 21 contact together, is substantially made equally to the outer diameter d1 of the needle 21 (D3≈d1). Amount L of the protrusion of the contacting edge 32a is substantially made equal to or smaller than the thickness T of the needle 21 (L≦T). Further, the inner diameter D1 of the outer surface side of the gel injection hole 32 is made larger than the outer diameter D3 of the contacting edge 32a (D1>D3).

By these arrangement, the locating of needle 21 can be performed more precisely compared with that in the first embodiment when the gel material is injected into the gel holding hole 31 provided in the gel holder 30, by means that the edge of the tip portion of the needle 21 of the gel dispenser is made inserted into the gel injection hole 32 along the inner surface made in the tapered shape and the tip portion of the needle 21 is made contacted with abutment onto the contacting edge 32a. As a result it can be surely prevented that the gel material adheres to around the gel injection hole 32.

Further, because the amount of protrusion L of the contacting edge 32a is substantially made equally to or smaller than the thickness T of the needle 21, the injection of the gel material from the needle 21 is not disturbed by the contacting edge 32a, and it can be prevented that the tip portion of the needle 21 is detached from the gel injection hole 32 by the pressure of the gel material which is injected. At this point, as for the amount of the protrusion L of the contacting edge 32a, it is preferable that the amount of the protrusion is substantially made equally to the thickness T of the needle 21 (L=T) in order to improve effect of the locating of the needle 21.

Figure 10:
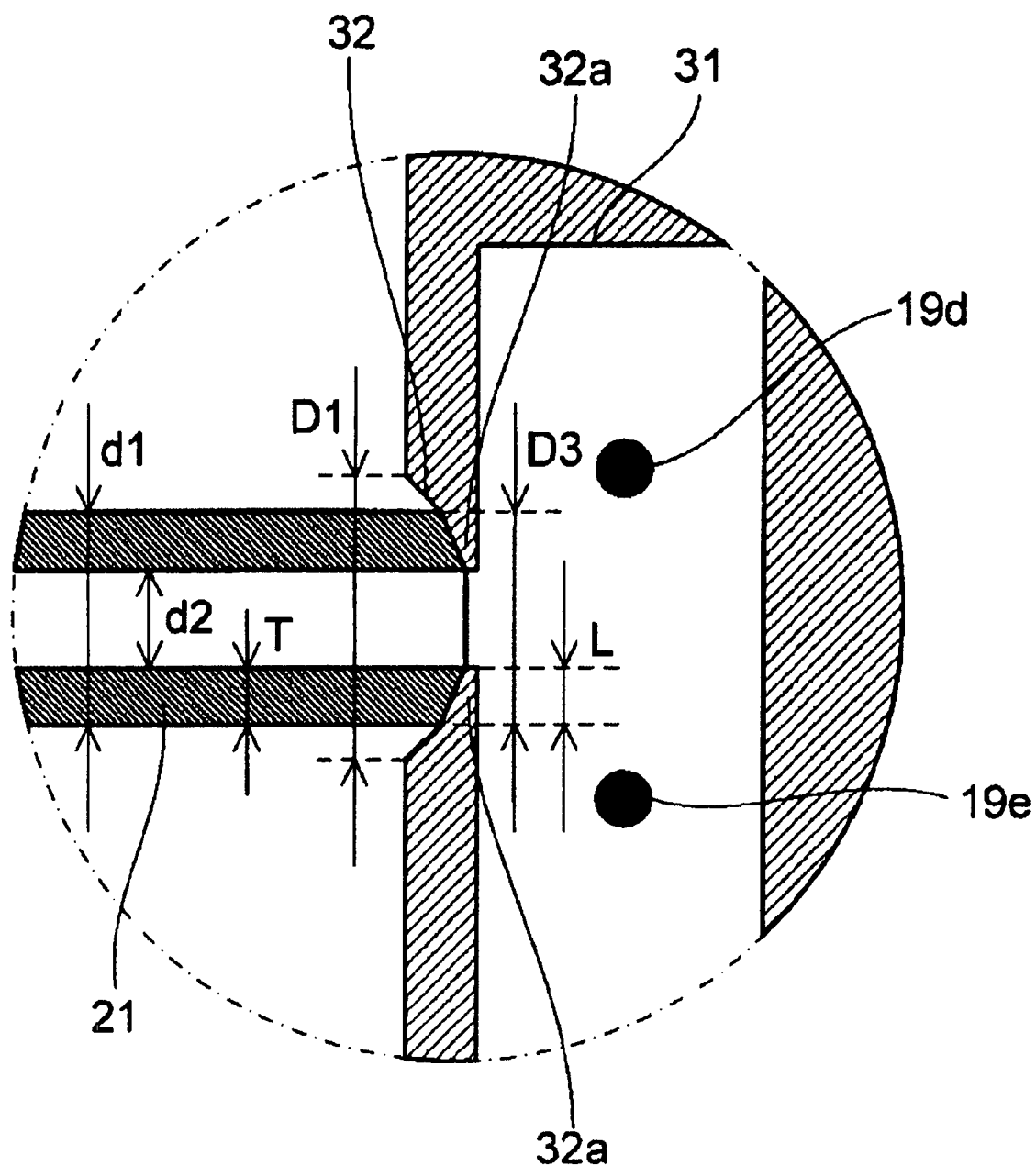
FIG. 10 is a partial enlarged view around a gel injection hole to show another structure of the gel holder according to the second embodiment.

At this point, if the edge of the tip portion of the needle 21 is made in tapered shape, as shown in FIG. 10, by making the contacting surface of the contacting edge 32a with the needle 21 in a tapered shape and by making the angle of taper of the contacting surface of the contacting edge 32a match with the tapered angle of the edge of the tip portion of the needle 21, there are not only effect of the locating of the needle 21, but also it is possible to control a shaking of the needle 21. Further, no space is made between the edge of the tip portion of the needle 21 and the inner surface of the gel injection hole 32, when the gel material is injected, spilling out of the gel material from the gel injection hole 32 can be prevented.

Figure 11:
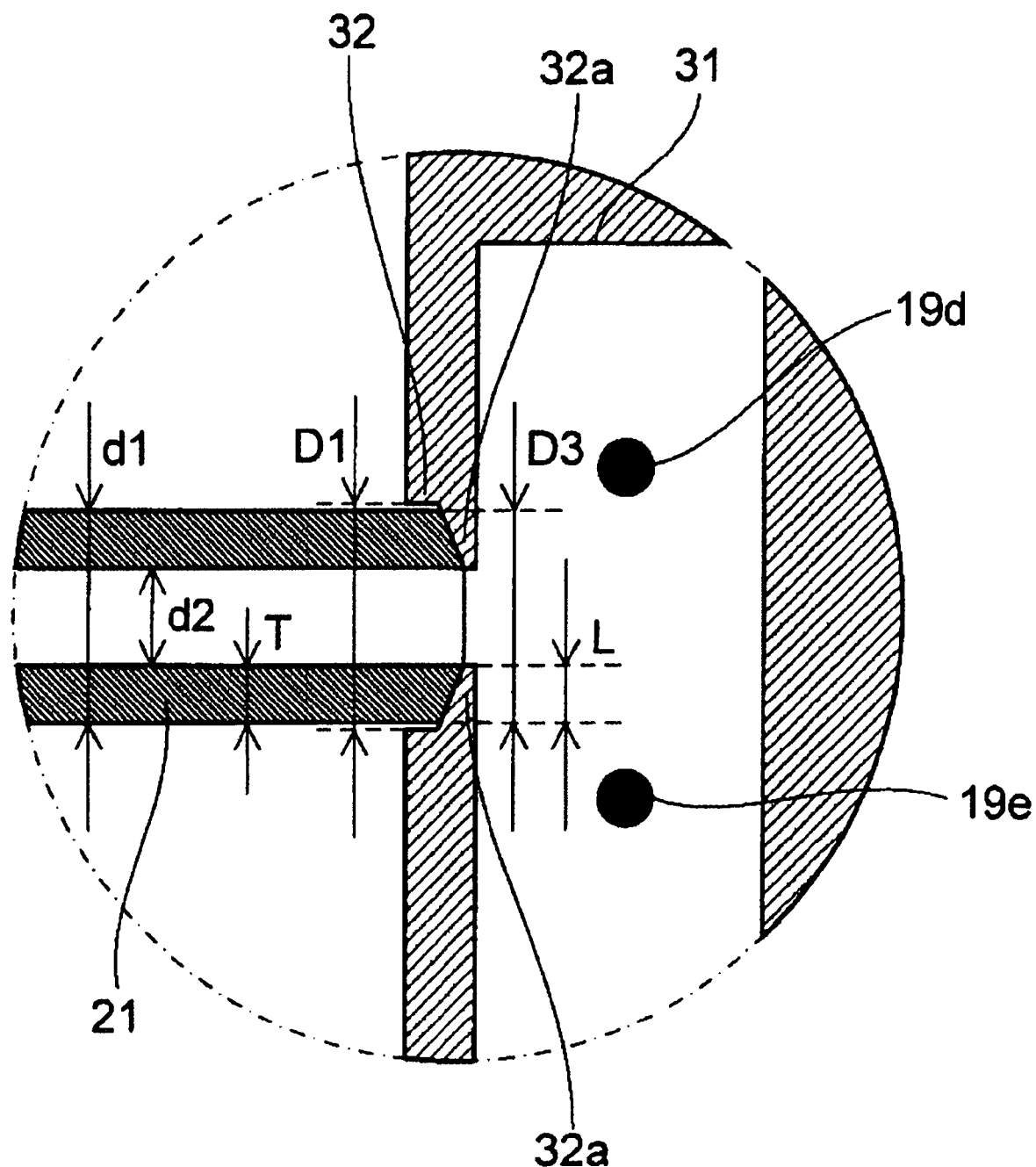
FIG. 11 is a partial enlarged view around a gel injection hole to show another structure of the gel holder according to the second embodiment.
Figure 12:
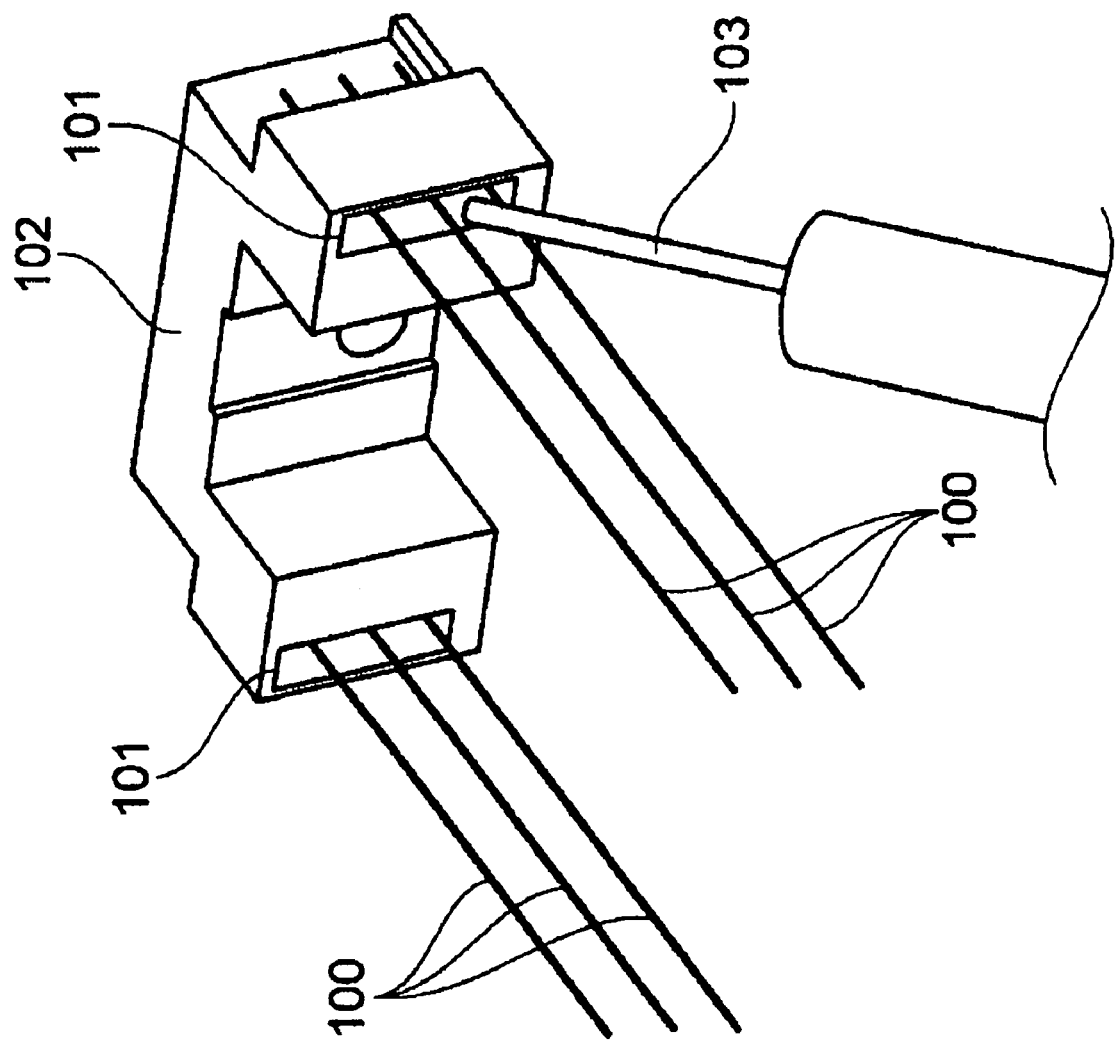
FIG. 12 is a perspective view to show a gel holder in the conventional technology.

When in a case that the edge of the tip portion of the needle 21 is formed in the tapered shape as above described, the edge of the tip portion formed in the tapered shape is inserted along the edge of the inner surface of the outer surface side opening of the gel injection hole 32 so the needle 21 can be inserted into the gel injection hole 32. As a result, in such a case the inner surface of the gel injection hole 32 is not necessary to be formed in the tapered shape as shown in FIG. 11.

In addition, it is preferable that the contacting edge 32a which is formed at the edge of the inner surface of the inner surface side opening of the gel injection hole 32, is formed at the entire inner surface of the gel injection hole 32 in order to secure the strength. However, when the contacting edge 32a is formed enough thick and its strength can be secured, the contacting edge 32a is not necessary formed at the entire inner surface.

The present invention should not be understood to be limited to the above described embodiments and various modification will be possible without departing from the spirit and scope of the invention. For example, in the above described first and second embodiment, the gel injection hole 32 is arranged with its opening on a side surface of the gel holder 30, however, the gel injection hole 32 may be arranged with its opening on upper surface of the gel holder 30. Further, though only one gel injection hole 32 is made by boring for each of the gel holding holes 31 in the above described embodiments, a plurality of gel injection holes 32 may be made by boring for each of the gel holding holes 31.

What is claimed is:

1. An objective lens actuator comprising:
    a base member having a yoke;
    an objective lens holder to which a plurality of coils are fixed for holding an objective lens;
    a plurality of rod-like elastic members to hold the objective lens holder in a movable manner;
    a permanent magnet to compose a magnetic circuit along with the yoke; and
    a gel holder having a plurality of gel holding holes inside of which a gel material is filled, and enabling vibration of the rod-like elastic members to be attenuated by inserting the rod-like elastic members into the gel holding hole,
    wherein the objective lens holder is moved by an electromagnetic action between the permanent magnet and the coils to move the objective lens,
    a gel injection hole connected to the gel holding hole is made by boring in a round shape on a side surface or an upper surface of the gel holder,
    an inner diameter of an outer surface side opening of the gel injection hole is made larger than an outer diameter of a needle of an injector which is utilized for injection of the gel material, and
    an inner diameter of an inner surface side opening of the gel injection hole is made smaller than an outer diameter of the needle.

2. The objective lens actuator according to claim 1, wherein the inner diameter of the inner surface side opening of the gel injection hole is substantially made equal to or larger than an inner diameter of the needle.

3. The objective lens actuator according to claim 1, wherein an inner surface of the gel injection hole is formed in a tapered shape whose inner diameter becomes smaller as it goes to inner surface side.

4. The objective lens actuator according to claim 1, wherein
    a contacting edge which protrudes to internal side of the radial direction of the gel injection hole is formed at the inner surface side opening of the gel injection hole to contact with abutment to the needle, the inner diameter of the gel injection hole at a position where the contacting edge and the needle contact with abutment, is made substantially equal to the outer diameter of the needle, and an amount of the protrusion of the contacting edge is substantially made equal to or smaller than a thickness of the needle.

5. The objective lens actuator according to claim 1, wherein the gel injection hole is made by boring in a position corresponding to the center portion between a couple of opening surfaces of the gel holding hole which are arranged opposing to an inserting direction of the rod-like elastic members.

6. The objective lens actuator according to claim 1, wherein an inner surface side opening of the gel injection hole is arranged at a portion which does not oppose to the rod-like elastic members that are inserted in the gel holding hole.

7. An optical pickup device comprising:

a light source;

an objective lens for condensing a light beam emitted from the light source on a recording surface of an optical recording medium; and an objective lens actuator including a base member having a yoke;

an objective lens holder to which a plurality of coils are fixed for holding the objective lens;

a plurality of suspension wires to hold the objective lens holder in a movable manner;

a permanent magnet to compose a magnetic circuit along with the yoke; and a gel holder having a plurality of gel holding holes inside of which a gel material is filled, and enabling vibration of the suspension wires to be attenuated by inserting the suspension wires into the gel holding hole, wherein the objective lens holder is moved by an electromagnetic action between the permanent magnet and the coils to move the objective lens, wherein a gel injection hole connected to the gel holding hole is made by boring in a round shape on a side surface of the gel holder, the gel injection hole is made by boring in a position corresponding to the center portion between a couple of the opening surfaces of the gel holding hole which are arranged opposing to an inserting direction of the suspension wires, an inner surface side opening of the gel injection hole is arranged at a portion which does not oppose to the suspension wires that are inserted in the gel holding hole, an inner diameter of the outer surface side opening of the gel injection hole is made larger than an outer diameter of a needle of an injector which is utilized for injection of the gel material, an inner diameter of the inner surface side opening of the gel injection hole is made smaller than an outer diameter of the needle, the inner diameter of the inner surface side opening of the gel injection hole is substantially made equal to or larger than an inner diameter of the needle, and an inner surface of the gel injection hole is formed in a tapered shape whose inner diameter becomes smaller as it goes to inner surface side.

* * * * *